(12) United States Patent
Hornbostel et al.

(10) Patent No.: US 8,165,815 B2
(45) Date of Patent: Apr. 24, 2012

(54) METHOD FOR ELECTROMAGNETIC AIR-WAVE SUPPRESSION BY ACTIVE CANCELLATION AND SHIELDING

(75) Inventors: Scott C. Hornbostel, Houston, TX (US);
Warren S. Ross, Houston, TX (US);
Leonard J. Srnka, Bellaire, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 853 days.

(21) Appl. No.: 12/161,785

(22) PCT Filed: Oct. 27, 2006

(86) PCT No.: PCT/US2006/041687
§ 371 (c)(1),
(2), (4) Date: Jul. 22, 2008

(87) PCT Pub. No.: WO2007/097787
PCT Pub. Date: Aug. 30, 2007

(65) Prior Publication Data
US 2010/0233955 A1    Sep. 16, 2010

Related U.S. Application Data

(60) Provisional application No. 60/775,061, filed on Feb. 21, 2006.

(51) Int. Cl.
*G01V 1/40* (2006.01)
(52) U.S. Cl. .......................................... 702/9
(58) Field of Classification Search .................. 702/9
See application file for complete search history.

(56) References Cited

U.S. PATENT DOCUMENTS

| | | | |
|---|---|---|---|
| 4,792,761 A | 12/1988 | King et al. | 324/350 |
| 5,770,945 A | 6/1998 | Constable | 324/350 |
| 6,381,544 B1 * | 4/2002 | Sallas et al. | 702/17 |
| 6,603,313 B1 | 8/2003 | Srnka | 324/354 |
| 6,628,119 B1 | 9/2003 | Eidesmo et al. | 324/337 |
| 6,765,383 B1 | 7/2004 | Barringer | 324/330 |
| 7,277,806 B2 | 10/2007 | Lu et al. | 702/76 |
| 7,822,562 B2 * | 10/2010 | Dennis | 702/38 |
| 2004/0239330 A1 | 12/2004 | Weaver et al. | 324/348 |
| 2004/0245991 A1 | 12/2004 | Hayman et al. | 324/374 |
| 2005/0134278 A1 | 6/2005 | Nichols | 324/348 |

(Continued)

FOREIGN PATENT DOCUMENTS

GB    2411006    8/2005

(Continued)

OTHER PUBLICATIONS

Bartel (1992) "Application of Wave Migration to Borehole Vertical Source EM Data," *Soc. of Exp. Geoph.—Expanded Abstracts*, New Orleans, LA, pp. 506-510.

(Continued)

*Primary Examiner* — Cindy H Khuu
(74) *Attorney, Agent, or Firm* — ExxonMobil Upstream Research Co. Law Dept.

(57) ABSTRACT

Method for reducing air wave and/or magnetotelluric noise in controlled source electromagnetic surveying by either shielding the source (61) from the air interface, shielding the receivers from downward traveling electromagnetic energy, or by employing a second source (62) to preferentially cancel the air wave (and MT) part of the signal, or a combination of the preceding.

15 Claims, 11 Drawing Sheets

U.S. PATENT DOCUMENTS

2007/0288211 A1* 12/2007 MacGregor et al. .............. 703/5
2010/0250140 A1* 9/2010 Constable et al. ................ 702/7

FOREIGN PATENT DOCUMENTS

| GB | 2415511 | 12/2005 |
|---|---|---|
| WO | WO 00/13046 | 3/2000 |
| WO | WO 01/57555 | 8/2001 |
| WO | WO 02/14906 | 2/2002 |
| WO | WO 03/025803 | 3/2003 |
| WO | WO 03/048812 | 6/2003 |
| WO | WO 03/100467 | 12/2003 |
| WO | WO 2004/008183 | 1/2004 |
| WO | WO 2004/053528 | 6/2004 |
| WO | WO 2005/010560 | 2/2005 |

OTHER PUBLICATIONS

Chave, A. D. et al. (1982) "Controlled Electromagnetic Sources for Measuring Electrical Conductivity Beneath the Oceans 1. Forward Problem and Model Study" *J. Geophys. Res.*, 87, No. B7, pp. 5327-5338.

Chave, A. D. et al. (1991) "Electrical Exploration Methods for the Sea Floor," *Soc. of Exp. Geoph.*, 2, pp. 931-966.

Chen, J. et al (2002) "3-D Inversion of Magnetometric Resistivity Data", *Expanded Abstracts, Soc. of Expl. Geophysicists* Ann. Mtg., Salt Lake City, Oct. 2002, pp. 633-636.

Coggon, J. H. et al. (1970) "Electromagnetic Investigation of the Sea Floor", *Geophysics*, v. 35, No. 3, pp. 476-489.

Constable, S. et al. (1996) "Marine Controlled-Source Electromagnetic Sounding 2. The PEGASUS Experiment", *J. Geophs. Res.*, v. 101, No. B3, Mar. 10, 1996, pp. 5519-5530.

Cox, C. S. et al. (1986) "Controlled-Source Electromagnetic Sounding of the Oceanic Lithosphere", *Nature* 320, Mar. 6, 1986, pp. 52-54.

Edwards, R. N. et al. (1978) "On the Theory of Magnetometric Resistivity (MMR) Methods", *Geophysics*, v. 43, No. 6, Oct. 1978, pp. 1176-1203.

Edwards, R. N. et al. (1984) "Offshore Electrical Exploration of Sedimentary Basins: The Effects of Anisotropy in Horizontally Isotropic, Layered Media", *Geophysics*, v. 49, No. 5, pp. 566-576.

Edwards, R. N. et al. (1985) "First Results of the Moses Experiment: Sea Sediment Conductivity and Thickness Determination, Bute Inlet, British Colombia, by Magnetometric Offshore Electrical Sounding", *Geophysics*, v. 50, No. 1, pp. 153-161.

Eidesmo, T. et al. (2002) "Sea Bed Logging (SBL), a New Method for Remote and Direct Identification of Hydrocarbon Filled Layers in Deepwater Areas", *First Break*, v. 20, No. 3, Mar. 2002, pp. 144-152.

Ellingsrud, S. et al. (2002) "Remote Sensing of Hydrocarbon Layers by Seabed Logging (SBL): Results from a Cruise Offshore Angola", *The Leading Edge*, v. 21, Oct. 2002, pp. 972-982.

Goldman, (1989) "On the Resolving Capability of Vertical Electric Dipole Soundings," $59^{th}$ *Annual International Meeting Expanded Abstracts, Soc. of Expl. Geoph.* Oct. 29-Nov. 2, 1989, pp. 204-207.

Hohmann, G. W. (1988) "Numerical Modeling for Electromagnetic Methods of Geophysics". Electromagnetic Methods in Applied Geophysics Theory, 1, *Soc. of Expl. Geoph.*, pp. 313-363.

Kong, J. A. (1990) *Electromagnetic Wave Theory*, 2nd Ed., John Wiley & Sons, Inc., pp. 312-321.

MacGregor, L. et al. (2001) "Electrical Resistivity Structure of the Valu Fa Ridge, Lau Basin, from Marine Controlled-Source Electromagnetic Sounding", *Geoph. Jrnl. Int.*, v. 146, pp. 217-236.

Pellerin et al. (1995) "A Parametric Study of the Vertical Electric Source", *Geophysics*, v. 60, pp. 43-52.

Stratton, J. A. (1941) *Electromagnetic Theory*, $1^{st}$ ed., MacGraw-Hill, p. 504.

Ward, S. H. et al. (1987), Electromagnetic Methods in Applied Geophysics, v. 1, pp. 162-167.

Widrow, et al. (1975) "Adaptive Noise Cancelling: Principles and Applications," Proc. IEEE v. 63, pp. 1692-1716. Document poor quality.

Young, P. D. et al. (1981) "Electromagnetic Active Source Sounding Near the East Pacific Rise", *Geophysical Research Letters*, v. 8, No. 10, Oct. 1981, pp. 1043-1046.

EP Search Report No. RS113666, dated Aug. 14, 2006, 2 pgs.

US 6,522,146, 02/2003, Srnka (withdrawn)

\* cited by examiner

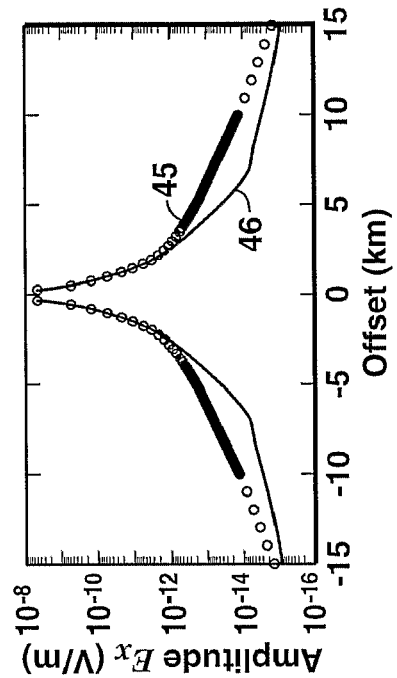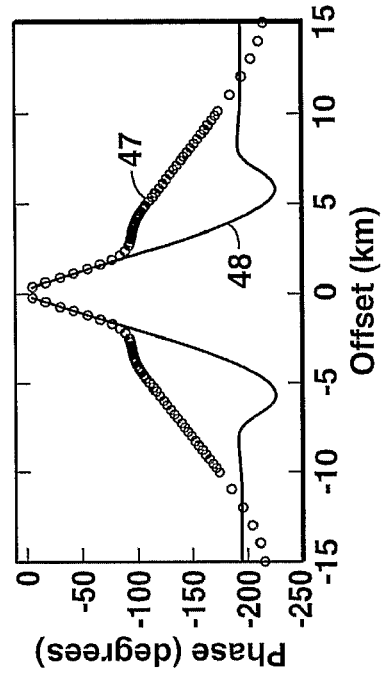
FIG. 4A *(Prior Art)*
FIG. 4B *(Prior Art)*
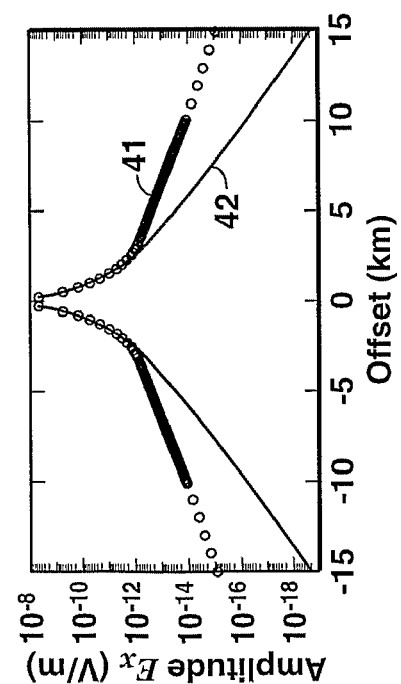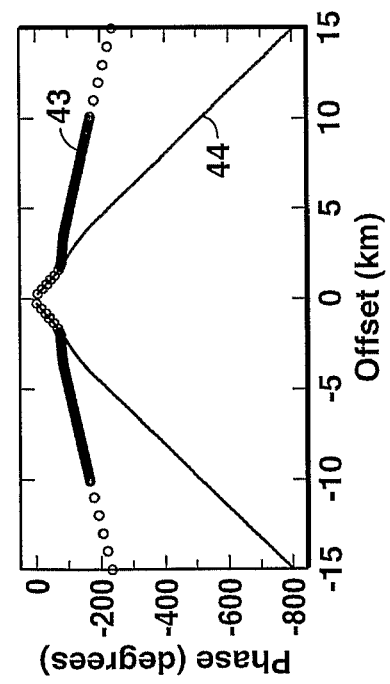
FIG. 4D *(Prior Art)*
FIG. 4E *(Prior Art)*

US 8,165,815 B2

METHOD FOR ELECTROMAGNETIC AIR-WAVE SUPPRESSION BY ACTIVE CANCELLATION AND SHIELDING

This application is the National Stage of International Application No. PCT/US2006/041687, filed on 27 Oct. 2006, which claims the benefit of now expired U.S. Provisional Patent Application No. 60/775,061, filed, on Feb. 21, 2006.

FIELD OF THE INVENTION

This invention relates generally to the field of geophysical prospecting and, more particularly to controlled source electromagnetic ("CSEM") surveying for hydrocarbons. Specifically, this invention is a method for addressing the air-wave problem that occurs in CSEM exploration in shallow water or on land.

BACKGROUND OF THE INVENTION

The controlled source electromagnetic survey method in a marine environment uses an applied source for mapping sub-seafloor resistivity variations; see, for example, U.S. Pat. No. 6,603,313 to Srnka. FIG. 1 is a schematic diagram of such a survey, with electromagnetic source 11 connected by cable to a vessel and receivers 12 located in the ocean, and often on the seafloor 13. The measured fields are analyzed to investigate the sub-sea floor structures of the earth's interior.

The electromagnetic signals recorded by receivers consist of electromagnetic fields 21, 22 and 23 that travel through the earth 33, seawater 32, and air 31, respectively, as illustrated in FIG. 2. The signal 23 that travels partly through air is called an "air wave." In addition to this controlled-source air wave, there is magnetotelluric (MT) noise propagating through the air caused, for example, by ionospheric disturbances. Offshore controlled-source electromagnetic geophysical surveys are normally operated at frequencies below 1.0 KHz. It is well known that, in this quasi-static frequency regime, penetration of electromagnetic waves into a medium varies inversely with both the frequency of the wave and the conductivity of the medium. This result follows from the theory of skin effect phenomena (J. A. Stratton, *Electromagnetic Theory*, page 504, MacGraw-Hill (1941)). Since the seawater is much more conductive than both air and the earth, electromagnetic signals through the seawater decay much faster than through the air and the earth. So, for source and receiver offsets longer than approximately twice the seawater depth, the recorded electromagnetic fields mainly come through the air and the earth. However, only the signals traveling through the earth provide information of the sub-sea floor structures of the earth's interior. For deep sub-sea floor targets 34, electromagnetic fields need to be generated at low frequencies to ensure that the transmitted electromagnetic signals 25 penetrate to the target depth. Unfortunately, for "shallow" water depth relative to the target depth and at low frequencies, the air wave signal may be dominant at receivers 12 with long offsets to the source 11 so that, the target signal is hardly distinguishable. Obviously, conditions are best for CSEM prospecting when signal 25 dominates the combined effects of signals 21, 22 and 23.

Air wave interference is a problem when measurements are made in the frequency domain, i.e., when the source continues to transmit its signals while data are being collected at the receivers. The simplest source signal is a sinusoidal signal with a selected frequency. For operational efficiency, multiple frequencies can be transmitted at the same time in the form of a complex waveform, such as a square wave. A complement to the frequency domain CSEM is the time domain CSEM. In time domain CSEM, the source is turned on and then turned off after a desired wave form is transmitted (for example, a pulse, a boxcar, or a step function). The air wave may not be a problem in time domain CSEM because the air wave will be recorded at an earlier time, separated from target signals. Frequency domain CSEM has certain advantages over time domain CSEM including the availability of more sophisticated modeling and inversion software, more familiarity with the results, and higher-quality data. As persons skilled in the art will understand, notwithstanding the preceding observations, all CSEM data are actually obtained in the time domain, i.e., they are collected by a recording device as a more or less continuous stream of numbers, with the independent variable being time. What distinguishes frequency domain CSEM is the way the experiment is conducted (continuous source) and the methods used to analyze and interpret the data whereby the data are decomposed into individual frequency components, e.g., Fourier analysis.

The air wave effect can be easily illustrated using a simple one-dimensional (1D) layered model. As shown in FIG. 3, from top to bottom, the model consists of five layers: non-conductive air 31, seawater 32 (conductivity=3.0 Siemens/m, depth to be varied in examples below), mud rocks 33 (1.0 Siemen/m, 1.0 km thick), resistive reservoir layer 34 (0.01 Siemen/m, 100.0 m thick), and basement 35 (1.0 Siemen/m). If the resistive layer 34 is the target and is removed from this model, a new model results and may be defined as the background model of the original model. A unit horizontal electric dipole source 11 directed in the x-axis (HEDx) is towed in the direction of the x-axis and 50 m above the seafloor. A seafloor receiver 12 is located right below the mid point of the source tow line (not shown in FIG. 3).

FIGS. 4A-4C are graphs of the amplitude of the x-component of electric fields ($E_x$) vs. source-receiver separation in the x-direction for both this 1D model and its background model. The seawater depth is 5.0 km in FIG. 4A, 1.0 km in FIG. 4B, and 100 m in FIG. 4C. FIGS. 4D-4F show the corresponding "unwrapped" phase, for the same three seawater depths. Unwrapped phase is obtained by changing absolute jumps greater than $\pi$ to their $2\pi$ complement. The curves of small circles represent data from the 1D model and the solid lines are from the background model. For the seawater depth of 5 km (FIGS. 4A and 4D), there is negligible air wave effect on data from both models for all source and receiver separations plotted in the figure. Large separation between the 1D model's curves 41 and 43 and its background curves 42 and 44 indicates that the signal from the resistive layer buried 1.0 km below the seafloor is significant when the source-receiver separation is larger than ~2 or 3 km. (The lack of separation between the model and background curves for small source-receiver spacing is due to the correspondingly low attenuation of the water path 22 and the seafloor path 21. Contribution from those two signals dominates the received signal for receivers with small offset (source-receiver separation), even with the target layer in the model.) When the seawater depth is decreased to 1.0 km (FIGS. 4B and 4E), the separation between these two curves shrinks significantly because of the air wave effect, i.e., the path 23 in FIG. 2 now travels through much less water and consequently attenuation of the unwanted air wave is greatly diminished. This effect is magnified with increasing offset. At offsets longer than ~6 or 7 km, the air wave effect dominates the received signal for the background model. This can be seen from the background curves 46 and 48 in FIGS. 4B and 4E, in particular the break in slope of the amplitude curve 46 around 6 km and the constant phase of the phase curve 48 beyond ~7 km. However, no such features appear in the data curves 45 and 47 for the 1D model with the buried resistive layer because the signal from the buried resistive layer is still stronger than the air wave effect for this 1D model with 1.0 km water depth. This no longer holds when the seawater depth is 100 m, for which FIG. 4C shows that model data with and without the resistive reservoir layer are hardly distinguishable in amplitude for all offsets. (The significant departure between the two phase curves of FIG. 4F for offsets greater than ~3 km is primarily an effect of the infinitely extended 1D model used rather than being due to signal from the target; this effect would be essentially eliminated with a more realistic model.) Matters would be even worse for field data with MT noise. This implies that the air wave effect dominates the received signal even though the signal from the sub seafloor target is strong. The results from this example clearly demonstrate the problem of the air wave effect.

Thus, for typical marine CSEM acquisition, the thick layer of conductive water above the source and receivers serves the important purpose of attenuating the air-wave path as well as attenuating the atmospheric MT noise. In the shallow-water case, however, the air wave and MT noise can have significant amplitude that masks the desired signals. Shallow water is defined as having a small number of skin depths and is thus a function of the source frequency. (The electromagnetic "skin depth" is a function of frequency [inversely proportional to the square root of the frequency] and determines the decay, and hence the effective depth of penetration, of an electromagnetic signal in a conductive medium such as salt water.) Lower frequencies that are required for greater earth penetration also require greater water depths to adequately attenuate the air-wave path.

Ambient MT noise is uncorrelated with the controlled source signal. As a result, typical approaches to minimize the effect of this noise involve doing more repetitions of the source waveform or using higher source energy levels.

Several approaches have been attempted to minimize controlled-source EM air-wave noise. In some approaches, different aspects of the data are examined while in others a processing method is used to remove air-wave noise. While all of these methods work to some extent, the existence of a very large air-wave component means that inaccuracies in the methods can lead to substantial residual noise. In contrast, the present invention actually reduces the EM energy that makes it into the air and the noise is never recorded.

In the category of examining different data components, one could use $E_z$ (vertical field) data. Most air-wave related noise in the water is oriented in the $E_x$ (in-line horizontal) direction. Although $E_z$ can be a helpful addition, its drawbacks include the smaller signal strength (causing greater MT noise problems), the remaining air-wave effect that still occurs in $E_z$, and the additional air-wave noise that is recorded on an $E_z$ receiver when it is not perfectly vertical.

A similar approach is to use a vertical electric dipole source, since it is known that a VED will generate a very small air wave. By reciprocity, there are similar issues (e.g., small signal, sensitivity to alignment). Also, there may be logistics issues in operating a moving vertical electric source in the ocean.

Another component-related approach (see G.B. Patent No. 2411006 to MacGregor, et al.), emphasizes the use of the vertical gradient of the horizontal field. The required data can be obtained with vertically separated receivers or sources. The issues in this approach are similar to the previous examples. A vertical gradient $d/dz(E_x)$ is a difference of two, small, comparable signals. The result is a very small signal that could have substantial ambient-noise problems. The airwave effect is also not completely removed.

In the category of processing approaches, air-wave contaminated data are recorded and then an attempt is made to minimize the noise by subsequent processing. In one example, Lu et al. in U.S. Provisional Patent Application No. 60/482,681 use a 1D modeling-based approach to estimate the air wave for later subtraction. MT noise in the field data, however, can compromise the results leaving residual airwave effects.

In another processing approach, Amundsen (WO 2003/100467) proposed decomposing EM fields into up going and down going components and using the up going component to derive the nature of the subsurface. This decomposition is an approximation and coupled with data noise can lead to incomplete airwave suppression.

SUMMARY OF THE INVENTION

The invention is a method for reducing the amount of source signal reaching a receiver through an air wave path (air wave noise), or reducing magnetotelluric (MT) noise at the receiver, or both, in the course of electromagnetic field measurements in a controlled source electromagnetic survey of a subterranean region. In one embodiment, the invention comprises (a) deploying a primary electromagnetic source and at least one receiver;

(b) selecting at least one approach from a group consisting of:
  (i) deploying a second electromagnetic source with its output signal designed to reduce air wave and MT noise by cancellation in combined measured responses of the two sources;
  (ii) deploying a conducting shield above the electromagnetic source so as to prevent source signal from escaping the subterranean region into the air above, thereby reducing air wave noise; and
  (iii) deploying a conducting shield above a receiver to reduce electromagnetic energy traveling downward toward the receiver, thereby reducing air wave and MT noise; and (c) activating the source or sources and collecting data at the one or more receivers.

BRIEF DESCRIPTION OF THE DRAWINGS

The present invention and its advantages will be better understood by referring to the following detailed description and the attached drawings in which:

FIGS. 4A-C are graphs of the amplitude of the x-component of the electric field $E_x$ vs. source-receiver separation for different water depths, calculated from the model of FIG. 3;

FIGS. 4D-F are graphs of the unwrapped phase of $E_x$ vs. source-receiver separation, calculated from the model for the same three water depths;

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

The present invention is a method for reducing air-wave noise and/or MT noise in CSEM survey measurements by either signal cancellation or shielding, or a combination of both.

Figure 1:
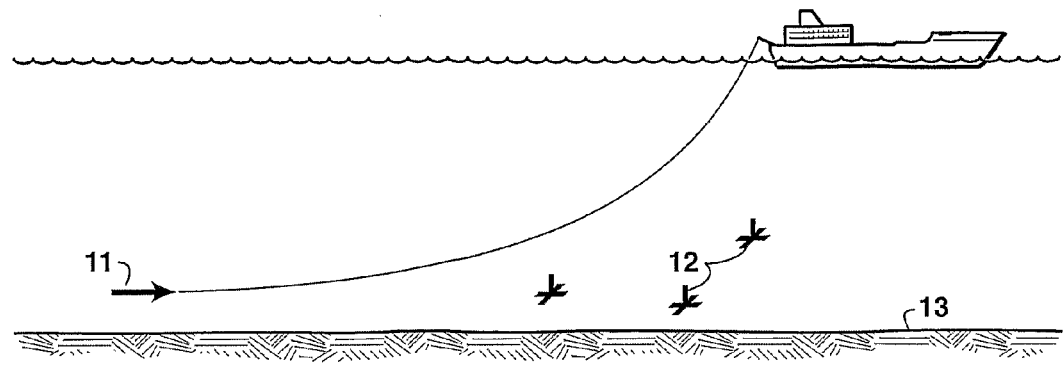
FIG. 1 is a schematic drawing of a CSEM survey.
Figure 2:
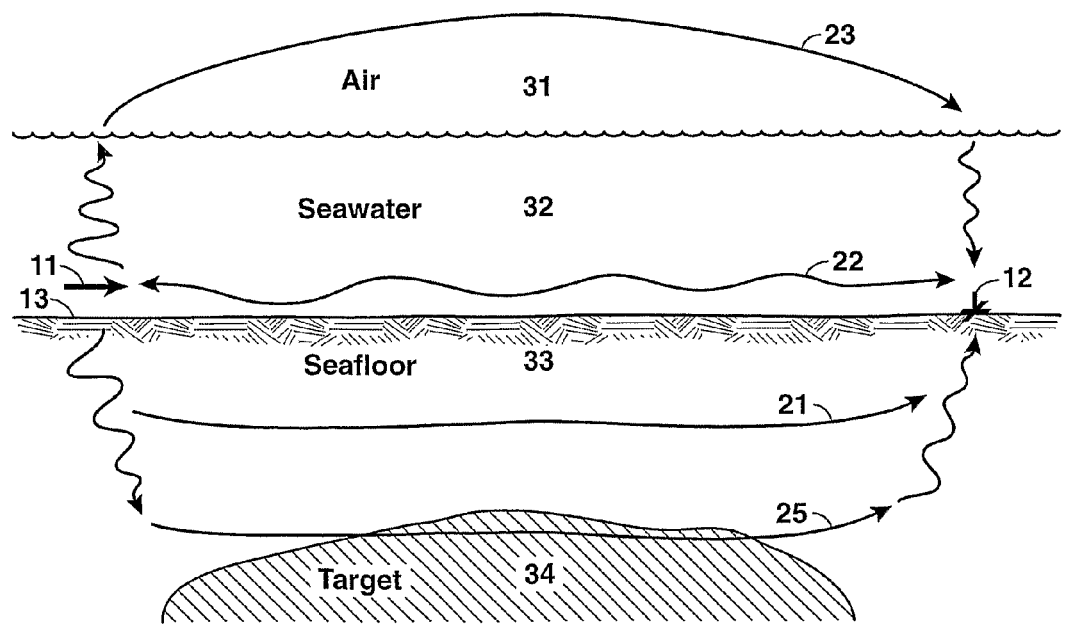
FIG. 2 is a schematic diagram of electromagnetic signal pathways for a CSEM survey.
Figure 3:
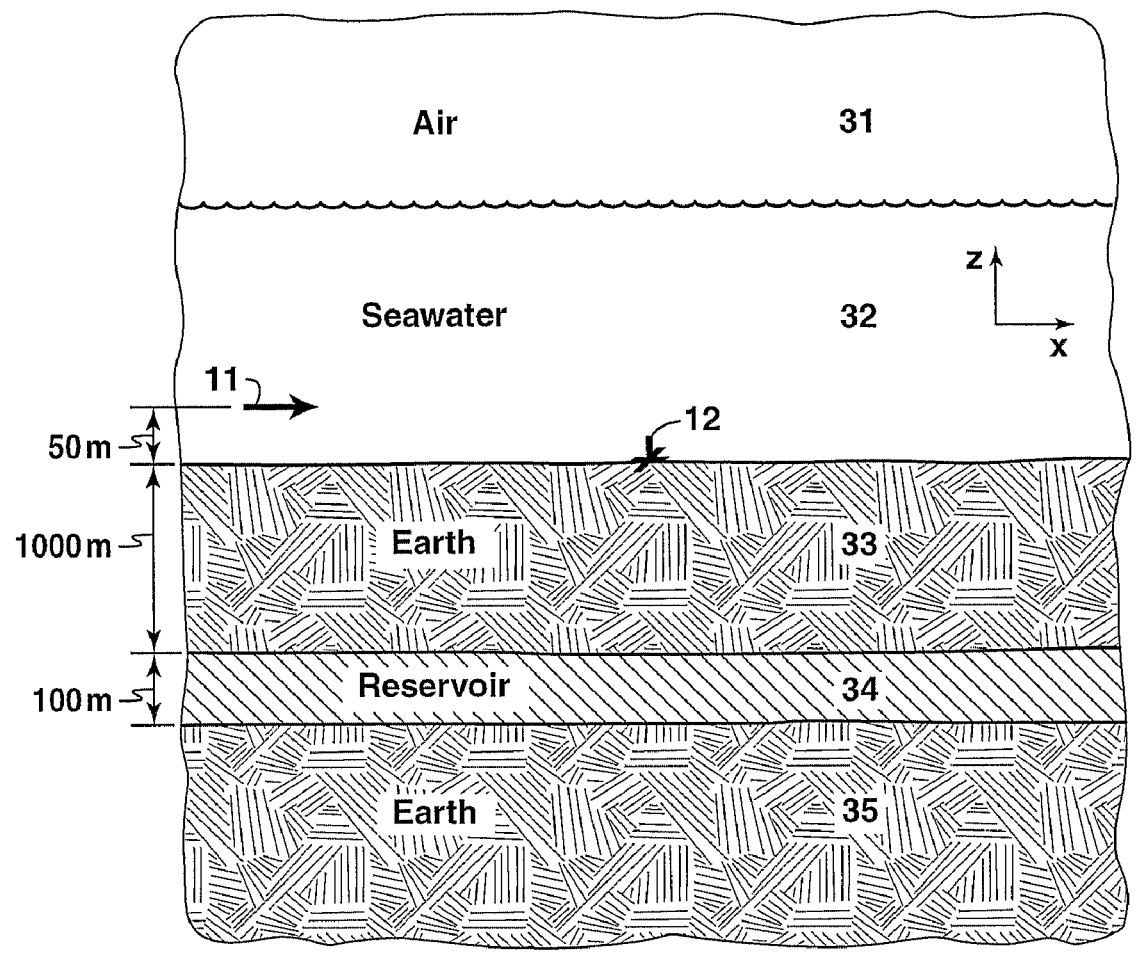
FIG. 3 illustrates a one-dimensional layered model of the earth at an ocean location, also showing CSEM source and receiver location.
Figure 4C:
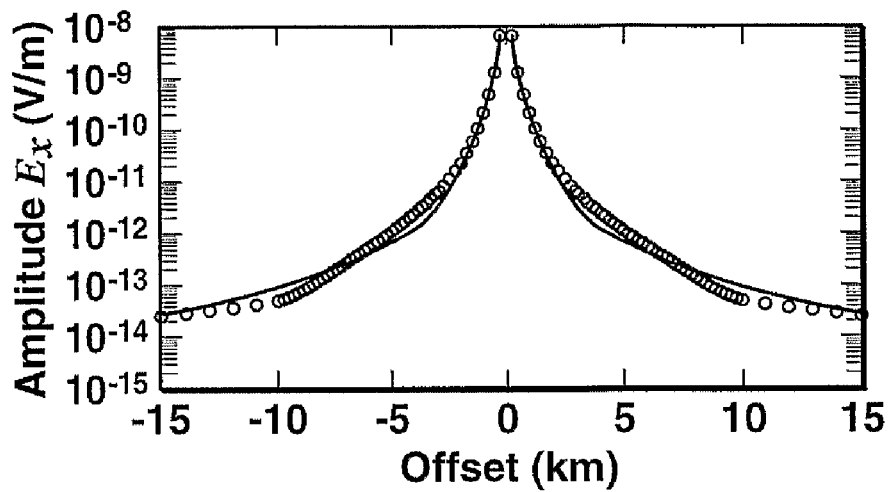
Figure 4F:
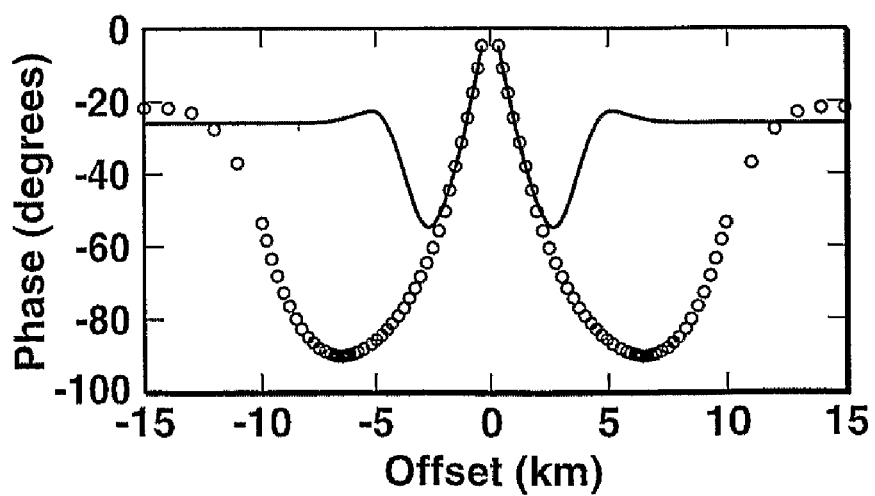
Figure 5:
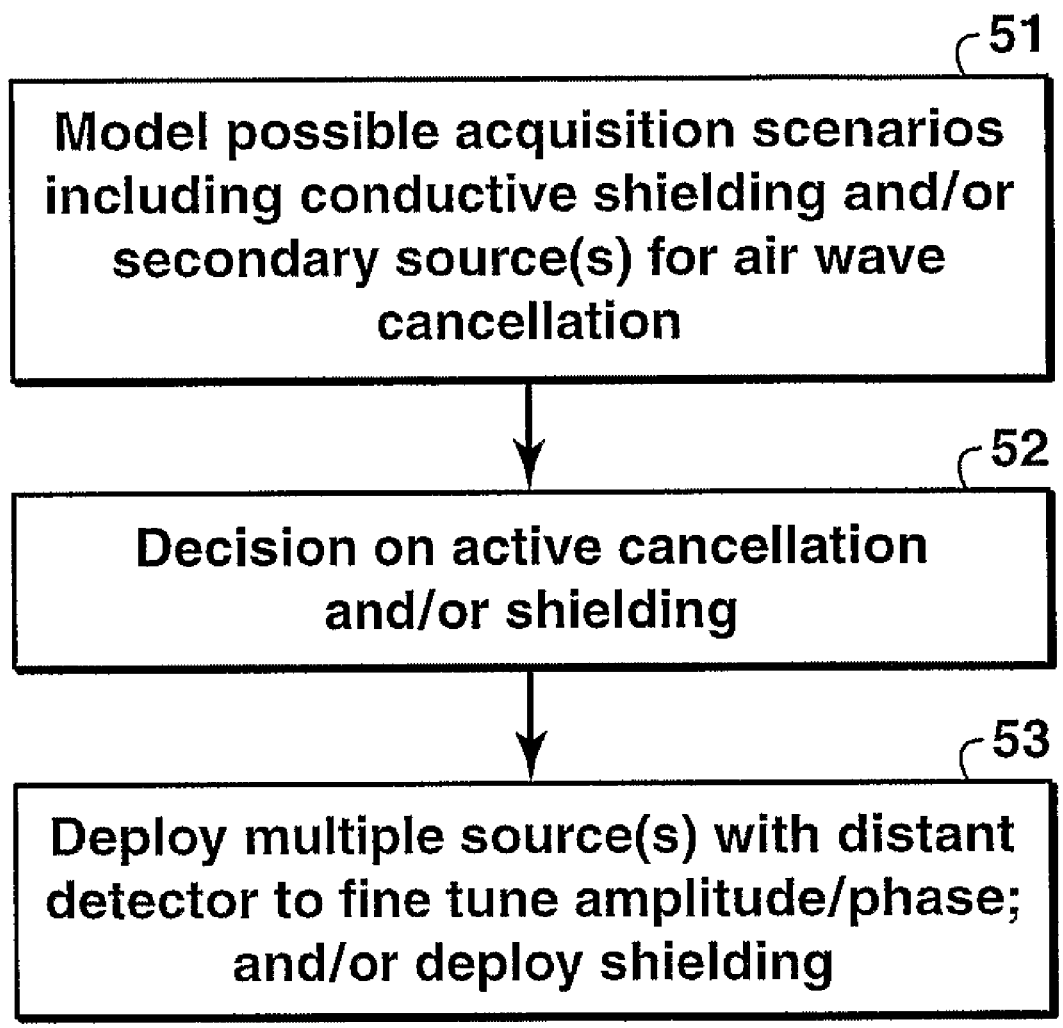
FIG. 5 is a flowchart indicating the scope of the present inventive method.

The high-level flowchart in FIG. 5 indicates basic steps of the present invention. The first stage of the invention (step 51) in preferred embodiments of the invention involves modeling to help guide a choice between active cancellation and/or shielding, and to estimate some of the related parameters. The modeling will preferably include separate implementations of active cancellation and shielding as well as the joint implementation of these two approaches. The joint modeling is useful because the methods have interactions that must be considered. As part of the modeling, it is preferable to consider the effects of both the source-generated air wave and the atmospheric MT noise. However, step 51 is not essential to the invention. At step 52, a decision is made about the field implementation, i.e., whether to use the active cancellation or conductive shielding, or both. Although that decision is preferably made based on modeling, it may instead be based on experience or other indicator. Finally, at step 53, the data acquisition methods according to the present invention and consistent with the decision in step 52 are deployed.

The modeling can include finite-element or finite-difference electromagnetic modeling with acceptable geologic parameters. How to perform such modeling calculations is well understood in the art. Alternatively, rules-of-thumb, analytic expressions, or even physical models could be used to make an appropriate implementation decision. Of course, implementation costs vs. benefits would be a primary issue in this decision.

Figure 6:
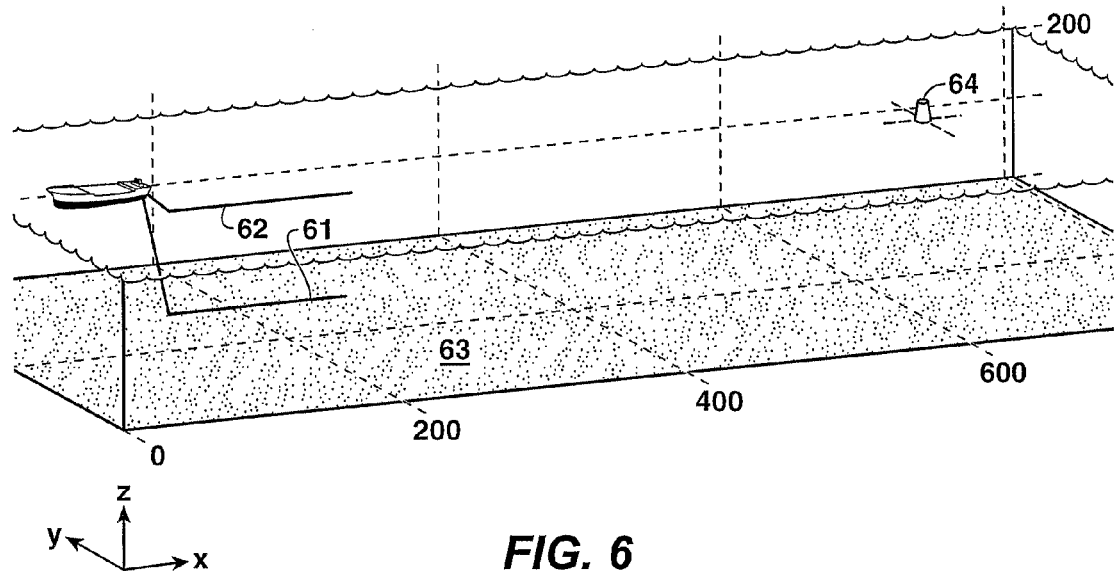
FIG. 6 illustrates dual source deployment for active cancellation, with a deep primary bipole source, a shallow secondary source, and a distant airwave detector.

FIG. 6 illustrates the basic deployment for the active cancellation option. A primary source 61 is normally towed near the water bottom 63 as is typical in CSEM acquisition; at least one secondary source 62 is provided in the present inventive method, and it is towed above the primary source at a relatively shallow depth. It is normally preferred to have as much separation as possible between the primary and secondary sources. This is because the upward traveling (undesired) deeper source energy then has a chance to be somewhat attenuated by the time the energy reaches the location of the secondary source. As a result, a smaller amplitude will be required in the secondary canceling signal. This is preferred because it will then perform relatively less canceling in the downward (desired) direction.

Precise location of the secondary source is not critical (e.g., it can be off to one side if desired) in the present inventive method because the wavelengths of the signal in the air are extremely large. Preferable values for the relative amplitude and phase of the secondary signal can be estimated by modeling while trying to minimize the energy in the air (or, better yet, maximizing the ratio of energy in the reservoir divided by energy in the air).

The modeling can also be used to evaluate possible benefits from using several secondary canceling sources or from varying parameters such as source depths, bipole lengths, or source positions. The additional canceling sources could give an improved air wave noise suppression by better approximating the divergence pattern of the primary noise source. The additional canceling sources would be particularly useful for MT noise suppression where the noise is widespread and where there would be a need to blanket an area with canceling signals.

The primary source will normally consist of one or more frequencies of interest. In fact, any repeating signal can be expressed (e.g., by Fourier analysis) as a sum of separate frequency components. For each of these frequency components, an amplitude and relative phase are required to relate the primary source to the optimal canceling secondary source. Ideally, the secondary signal will be a filtered version of the primary source signal that includes all of these relative amplitudes and phases; however, attaining this ideal is not essential for using the present inventive method.

The desired air wave cancellation is sensitive to the choice of secondary signal. Therefore, a preferred deployment includes a distant E-field detector 64 to assess the level of air-wave energy and provide this signal as feedback to adjust the secondary signal. The distant detector is depicted in FIG. 6 as a buoy but could also be implemented as a towed receiver from the source boat or from a second boat. The feedback implementation, i.e. an embodiment of the invention that uses feedback, is preferred since the model-based optimization may be less accurate due to, for example, imprecise knowledge of the earth's conductivity structure. An algorithm to perform this adjustment is discussed later. Other options exist for performing this step, including hand-adjusting the secondary amplitude at certain intervals to minimize the detected air-wave signal, or using the values determined from prior modeling.

The feedback-based cancellation is affected by both the source-generated air wave noise and the ambient MT noise. To begin with, the MT noise is recorded at the distant detector along with the controlled-source air wave. Since the adaptive algorithm works to reduce all energy in the distant reference, the secondary source will act to reduce MT effects while reducing the controlled-source air-wave effects. The presence of the MT noise can have a positive effect as far as some reduction of MT noise at the receivers. It may also, however, have the negative effect that the reduction of source-generated noise is sub-optimal. A proper tradeoff of these effects can be determined as part of the initial modeling or by some preliminary field testing. One can control the tradeoff by proper positioning of the distant detector or by selecting appropriate parameters in the feedback algorithm.

The location of the distant detector is preferably chosen to be at an offset that would be dominated by air-wave effects. Other, less desired, options would include using an antenna in the vicinity of the towing vessel or using one or more of the deployed ocean-bottom detectors. These options are less preferred because they could be expected to contain more of the desired signal that could then be altered by the cancellation process. In addition, if the offset is too large, the recorded noise reference may be dominated by ambient MT noise that would affect the quality of the noise suppression.

Figure 7:
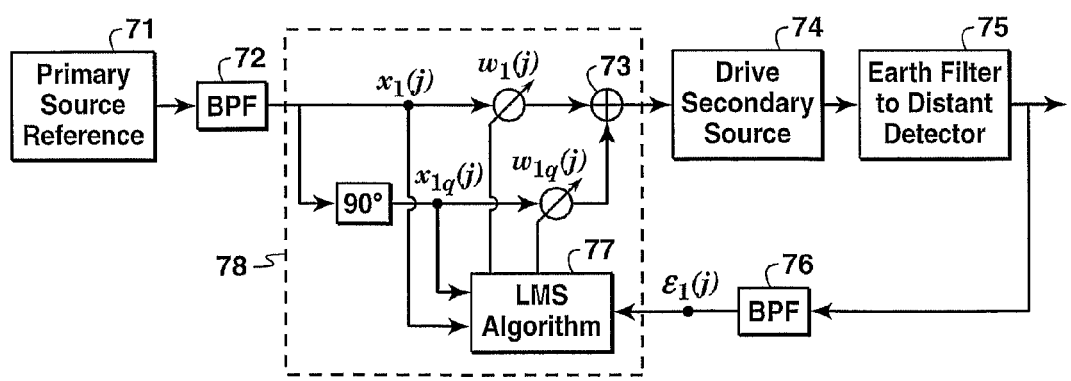
FIG. 7 is a flowchart showing steps of an adaptive noise cancellation embodiment of the invention, for a single-frequency source waveform, primary and secondary sources, and a distant air wave noise reference.
Figure 8:
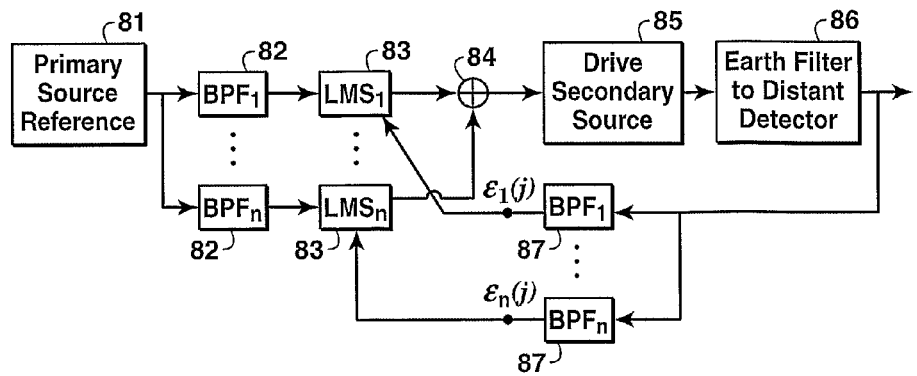
FIG. 8 is a flowchart showing steps of an adaptive noise cancellation embodiment of the invention, for a multi-frequency source waveform, primary and secondary sources, and a distant air wave noise reference.

FIGS. 7 and 8 depict a preferred method for fine-tuning the secondary source's amplitude(s)/relative phase(s) in the active cancellation option. This approach is modified from the "least-mean-square (LMS)" method taught in Widrow et al., ("Adaptive Noise Cancelling: Principles and Applications," *Proc. IEEE* 63, 1692-1716 (1975)).

FIG. 7 illustrates an adaptive filter approach applicable to a single source frequency. The primary source reference 71 is first fed into a bandpass filter 72 to select the frequency of interest in the source signal's frequency spectrum. The reference is the signal (waveform) that the source signal generator is set to transmit, for example a square wave. Alternatively, the reference could be a measured signal that has been transmitted by the source. The signal is then split into a normal and quadrature (90° phase shifted) version—$x_1(j)$ and $x_{1q}(j)$, respectively. (The signals are sampled in time and a particular sample is indexed by j.) The signal and quadrature signals are then scaled by scale factors $w_1(j)$ and $w_{1q}(j)$ and summed 73 before being used to drive the secondary, canceling source at step 74. Any guess may be used initially for the scale factors.

The primary and secondary sources propagate through the earth/water/air system and are recorded at the normal EM detectors (usually on the water bottom). In addition, in this embodiment of the invention, a distant horizontal E-field detector is located near the top of the water, such as detector 64 in FIG. 6. This detector is selected to obtain a signal that is dominated by the air wave. The distant detector would also record some MT noise. At 75, the recorded air-wave plus MT signal ($E_r$—the horizontal E-field component oriented away from the source) is transmitted back to the towing vessel and bandpass filtered 76 to the selected frequency for use in the LMS algorithm 77.

The returned residual air-wave signal $\epsilon_1(j)$ is combined with the primary reference signal and quadrature signal to update the scale factors as follows:

$$w_1(j+1)=w_1(j)+\mu\epsilon_1(j)x_1(j) \text{ and}$$

$$w_{1q}(j+1)=w_{1q}(j)+\mu\epsilon_1(j)x_{1q}(j)$$

where $\mu$ is an adaptation rate scale factor selected to balance fast adaptation (a larger $\mu$ value) with minimal adaptation noise (a smaller $\mu$ value). The smaller $\mu$ value is less affected by the ambient MT noise since the MT noise is random and will be averaged out by the slower adaptation.

The result of the iterative application of this algorithm is that the weights are driven to values that will minimize the energy in the distant air-wave plus MT signal. The use of a signal and quadrature signal is equivalent to allowing control of the amplitude and phase of the secondary source.

A typical source may consist of several frequencies of interest. A square-wave source, for example, contains a fundamental frequency and odd harmonics. The flow chart in FIG. 8 illustrates a modification of FIG. 7 for a case where the source signal contains several discrete frequencies. Essentially, the input primary source reference 81 is first bandpass filtered 82 to these frequencies and then the adaptation box 78 from FIG. 7 is applied 83 for each selected frequency. The scaled components are summed 84 and used to drive the secondary canceling source 85. As before, the feedback signal is taken from the distant detector 86 and is bandpass filtered 87 to the relevant frequencies.

Whether the primary source transmits at a single frequency or multiple frequencies, the secondary source must transmit at the same frequency or frequencies in order for active cancellation to work. FIG. 8 illustrates one way this can be done for the multi-frequency source case. It may be that the secondary source will not be flexible enough to generate the required summed cancellation signal 84. In that case, a compromise may have to be accepted with a secondary source signal that produces partial cancellation at each frequency. Alternatively, separate data acquisition runs may be employed, wherein a single frequency in the primary source's spectrum is cancelled in each run.

Figure 9:
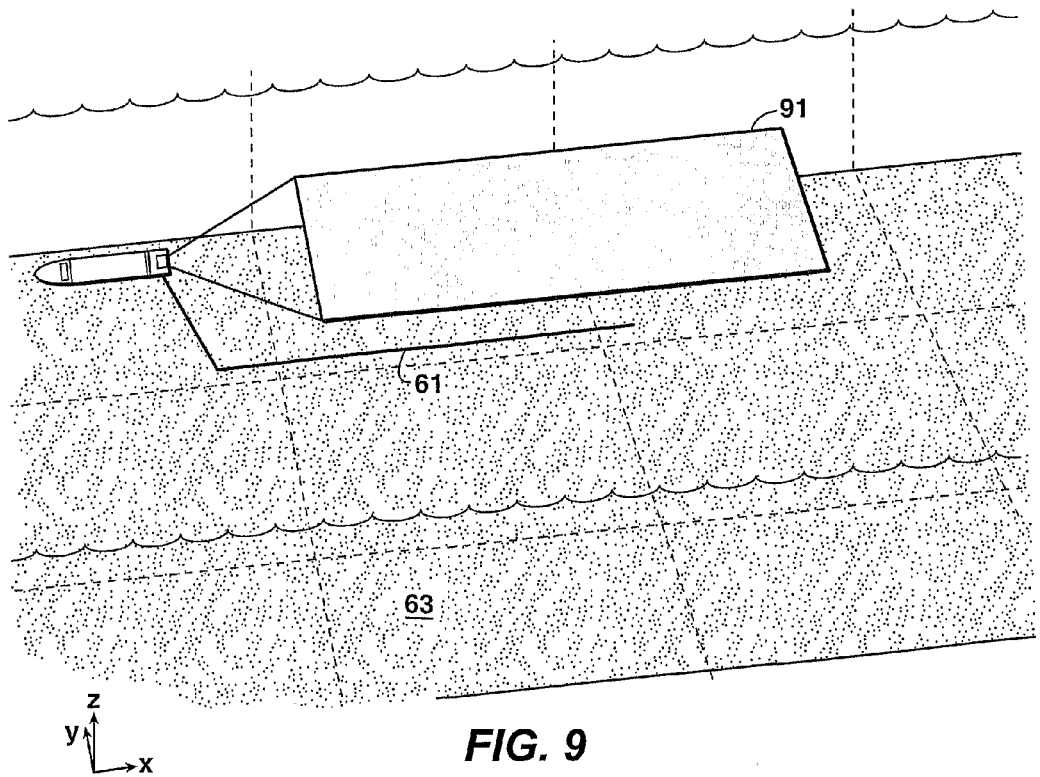
FIG. 9 illustrates a single bipole source with conductive shielding at the water surface.

FIG. 9 illustrates the basic deployment for the conductive shielding option. A single bipole source 61 is towed near the water bottom 63 as is typical in CSEM acquisition. Along the surface, a large area is covered with a conducting sheet 91 centered over the source. This shielding forces the EM energy to go around it before it can leak out into the air. As a result, the air-wave energy is reduced because it has taken a larger path through the attenuating water. The conducting layer could alternatively be made neutrally buoyant and placed above the source in the water layer. Criteria for designing the shield from an effectiveness standpoint are to use material with electrical conductivity as high as practical and with openings (mesh space) as small as practical (most preferably a solid sheet).

The major issues with shielding are due to the difficulty in implementation and the related economics. One factor that impacts the implementation and economics is the choice of shielding material. One option is to use thin conductive sheets—possibly a copper-coated mylar. Without limiting other choices, another option is to use a grid of crossing bare wires. A sparser grid might be more economic while trading off the degree of shielding. These options can be modeled to find the one that makes the most economic sense. Another parameter to model would be the positioning of the shielding material. The shielding, for example, can equivalently be located over the EM receivers or over both source and receiver(s), avoiding contact with them. Positioning of the shielding above the receiver(s) would have the additional advantage that it would simultaneously reduce the atmospheric MT noise. All airborne energy, whether MT noise or air waves, would be attenuated because it is forced to go around the shielding before reaching the receiver(s). Such a shield would have to be substantial in size, e.g. 10 m×10 in or larger; otherwise the undesired electromagnetic energy will still reach the receiver with little attenuation by traveling a short distance through the ground. FIG. 9 shows an embodiment of the invention in which the conductive shield is towed at or near the surface of the water, so as to maintain a position above the bipole source.

In a land implementation, the conductive sheet would most conveniently be arrayed to rest on the surface while the source bipole would be positioned beneath the surface—possibly using deep vertical electrodes or well casings.

EXAMPLES

In the following two examples, 3D finite-element modeling is used to predict expected levels of air-wave suppression for a specified simple 1D earth model. The model uses a 1.25 Hz single frequency bipole source of 300 m length and moment of 1 A-m (for the primary source). The water is 120 m deep (5 S/m conductivity). The primary source bipole is 20 m above the water bottom while the secondary (when used) is 20 m from the top of the water giving a separation of 80 m. Below the water layer is 700 m of shale (0.714 S/m vertical and 1.333 S/m horizontal conductivity). Below this is a 100 m reservoir (0.02 S/m conductivity) and a half space of shale (same as above). This 1-D model can be seen reflected in FIGS. 10A-B and 12A-B. The signal-to-noise ratio (SNR) in these examples is defined as the average total electric field in the reservoir at distances greater than 5 km divided by the average total electric field in the air also at distances greater than 5 km from the source(s).

Figure 10A:
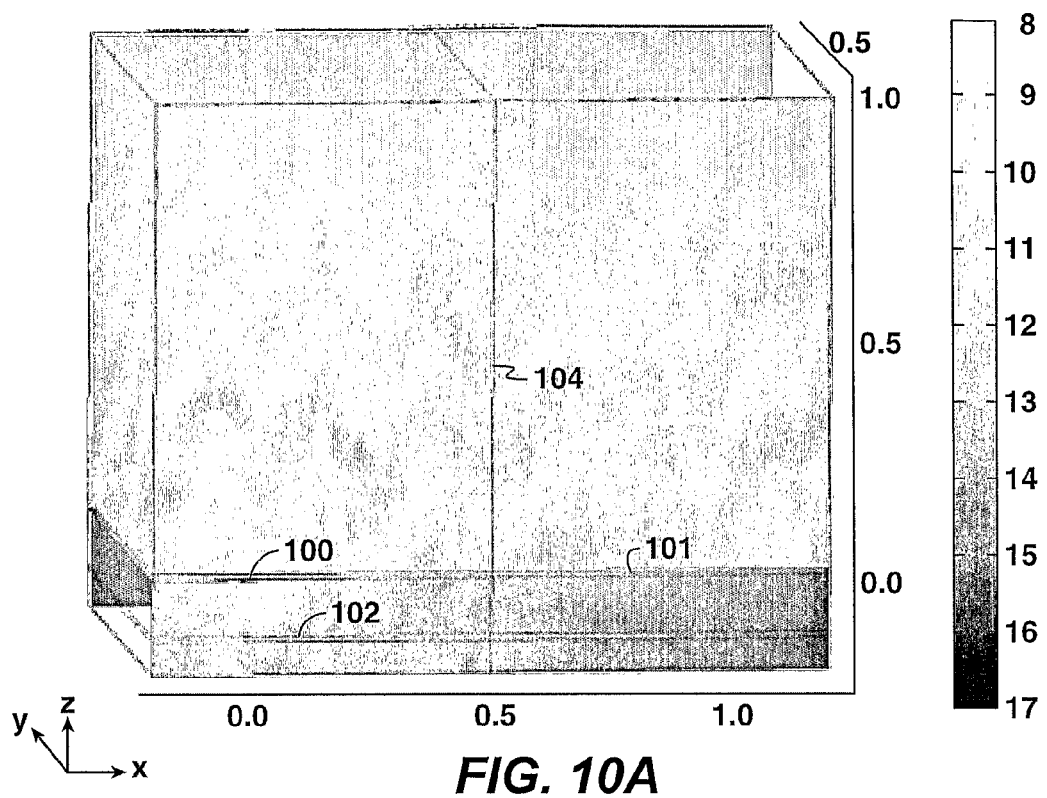
FIGS. 10A and 10B show displays of the log of the total electric field with a single primary bipole source, without (10A) and with (10B) an added secondary canceling bipole source.
Figure 10B:
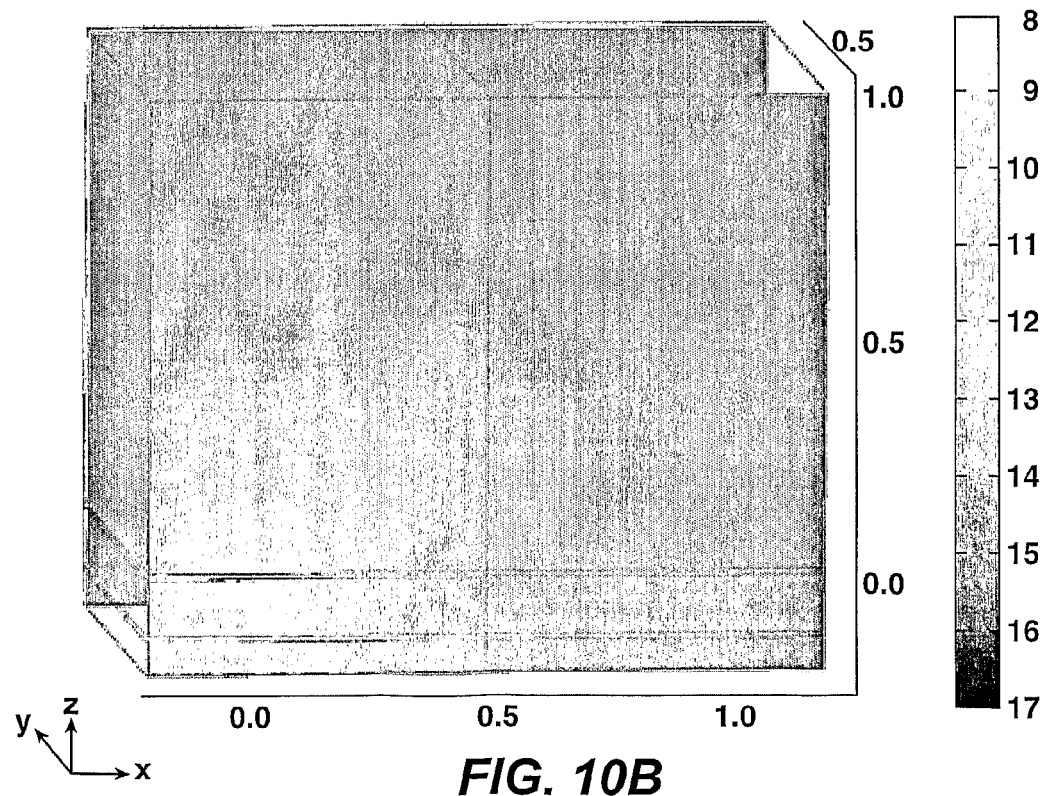

FIGS. 10A-B illustrate the modeled log of the total electric field (indicated by gray-scale, as shown to the right of each drawing), with (FIG. 10B) and without (FIG. 10A) active cancellation. A single bipole source (i.e., no cancellation) is located in the model calculation as indicated by 100 in FIG. 10A, and the related SNR is 0.0216. Line 104 indicates 5 km from the source. A secondary canceling source (not resolvable to the eye from the primary source in the scale used in FIG. 10B) is then added with amplitude of 0.7893 A-m and relative phase of 180°+19.71°. This amplitude and phase were selected to maximize the modeled SNR response giving a resulting SNR of 10.05 (an improvement factor of 465 over the no-cancellation case). This modeled response is shown in FIG. 10B. Each drawing (10A and 10B) shows a vertical slice from a 3D finite-element model in the plane that includes the source bipoles (the small segments in the lower-left corner). The relatively thin water layer of the model is indicated by 101 in FIG. 10A. The reservoir layer is denoted by 102. The base 10 log of total electric field $\sqrt{E_x^2+E_y^2+E_z^2}$ is displayed. A log display is needed since the field goes through several orders of magnitude in the display. (The peak is roughly 10-8 volts/m while the smaller values are roughly 10-15 volts/m.) The thin layer that includes the source is the 120 m water layer mentioned above while the deeper thin layer is the resistive reservoir. Note in FIG. 10A that the reservoir is illuminated (has a large field value) but that the air half space (the top three-quarters of the figure) also has a relatively large electric field. In FIG. 10B, the reservoir is still illuminated while the field in the air is significantly reduced. SNR values are obtained from the region to the right of line 104 in FIGS. 10A and 10B (greater than 5 km from the source). The scale for electric field values ranges from −8 at the top of the scale to −17 at the bottom. In practice, a color display would be preferable to the gray scale used in the drawings.

Figure 11B:
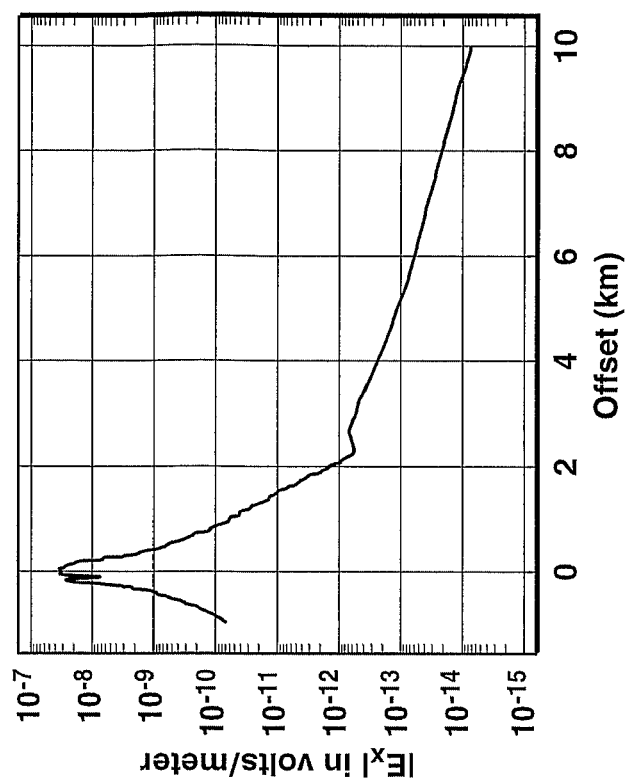
FIGS. 11A and 11B are plots of the absolute value of the inline (x) component of the electric field with (11A) and without (11B) air wave cancellation.
Figure 11A:
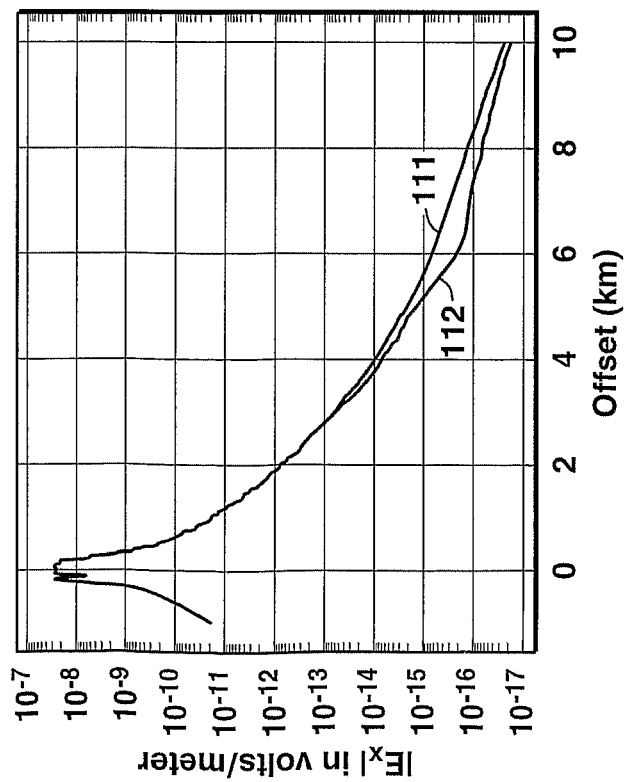

FIGS. 11A and 11B show that this air-wave suppression makes it possible to detect the presence of the reservoir where it was previously obscured by the air wave. FIG. 11A shows the absolute value of the inline electric field along the water bottom as a function of offset after air-wave cancellation. The model with the resistive reservoir is plotted 111 above the model with the reservoir replaced with additional shale 112. The effect of the reservoir is evident. FIG. 11B shows the electric field vs. offset without air-wave cancellation. The models with and without resistive reservoir are no longer distinguishable because of the strong air wave.

Figure 12A:
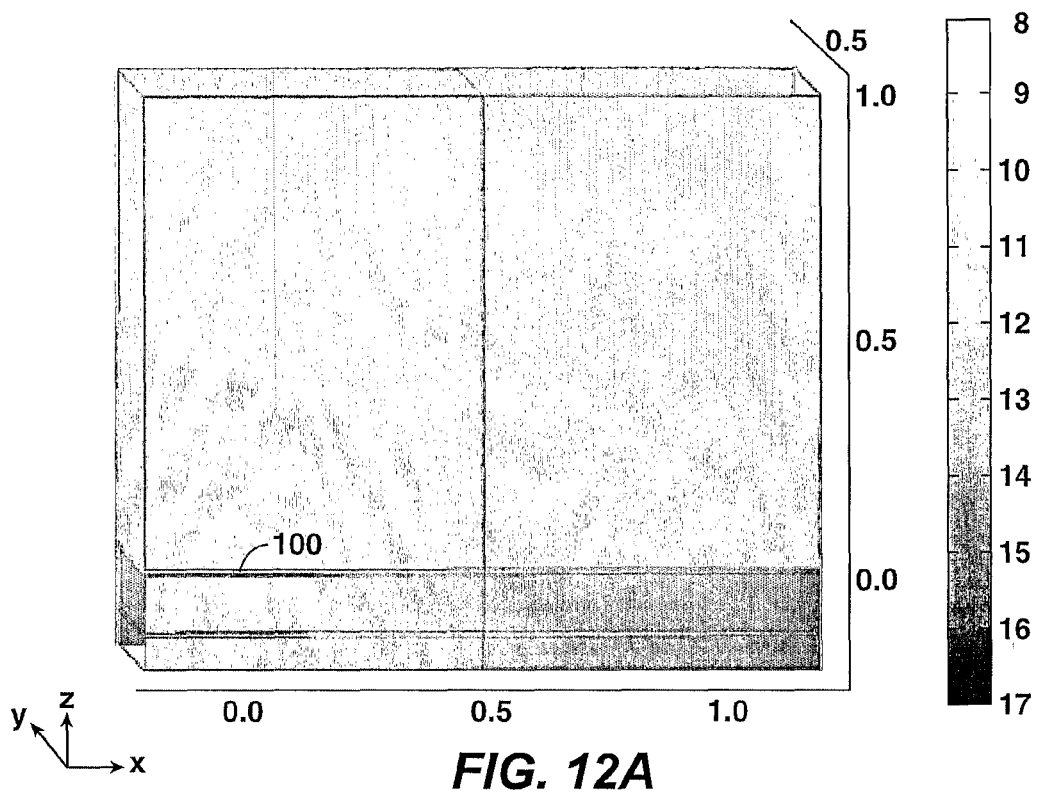
FIGS. 12A and 12B show displays of the log of the total electric field with a single bipole source, with (12B) and without (12A) added conductive shielding.
Figure 12B:
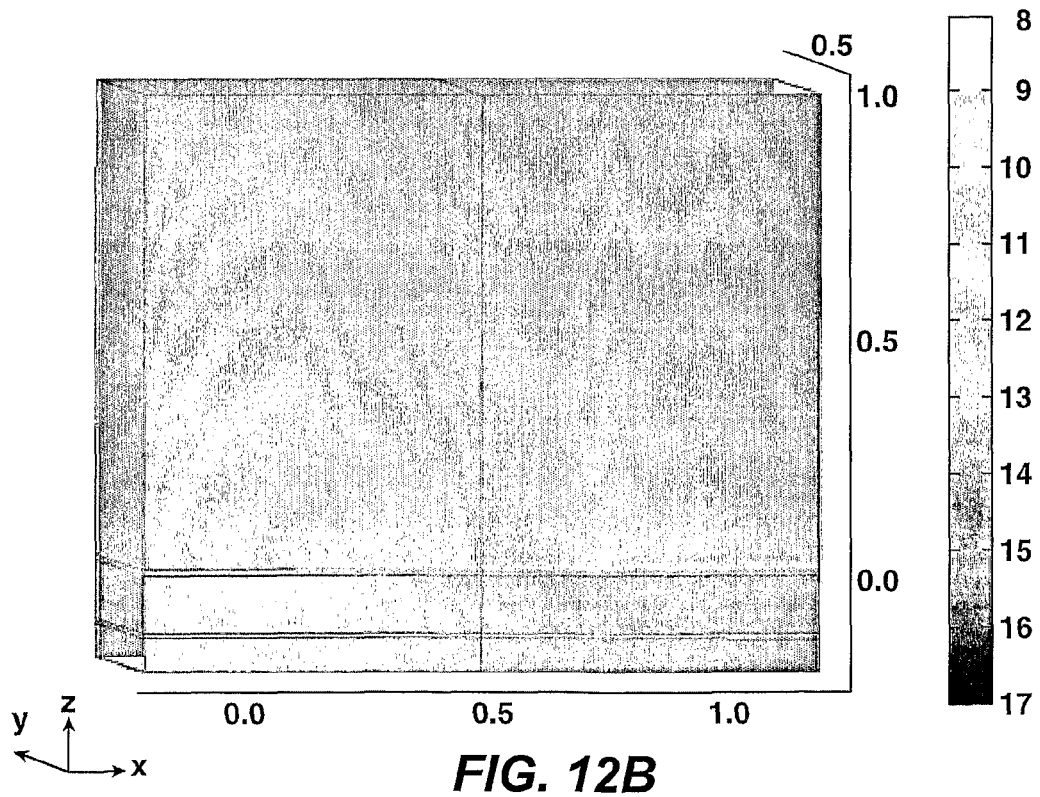

FIGS. 12A and 12B illustrate the modeled log of the total electric field for the case with (12B) and without (12A) shielding. A single bipole source (i.e., no shielding) is located as in the previous example with its presence indicated in FIG. 12A at 100, as in FIG. 10A, with the related SNR of 0.0216. Shielding of 3 km×3 km is then added in the model calculation at the water surface centered above the primary source, and the resulting electric field display is illustrated in FIG. 12B. Adding this perfectly conducting layer gives a resulting SNR of 3.83 (an improvement factor of 177 over the no-shielding case). To get a more accurate estimate of the shielding effect, other factors such as thin conductors with finite but large conductivity should also be examined. It would also be useful to model some simplifications such as using a grid of crossing wires instead of the conducting plate. These models will reduce the level of suppression but might be preferred for economic or logistical reasons.

Figure 13A:
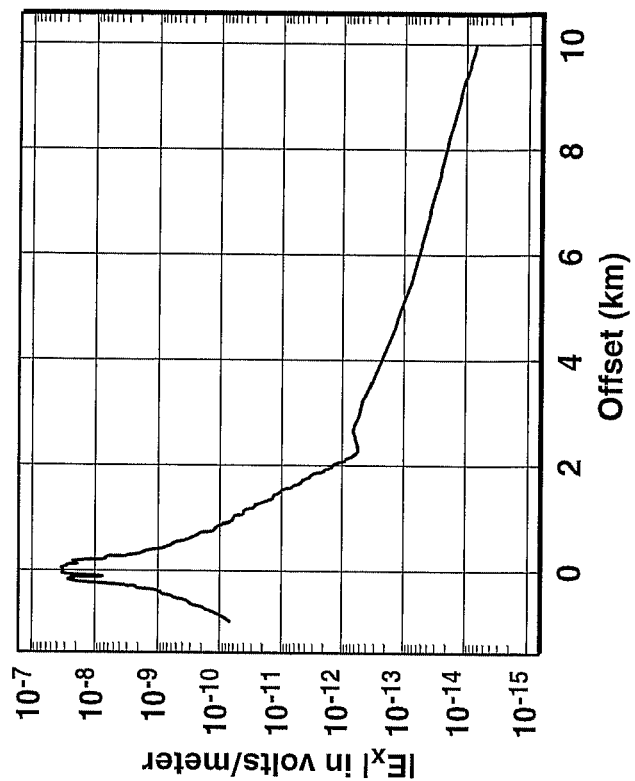
FIGS. 13A and 13B are plots of the absolute value of the inline (x) component of the electric field with (13A) and without (13B) shielding.
Figure 13B:
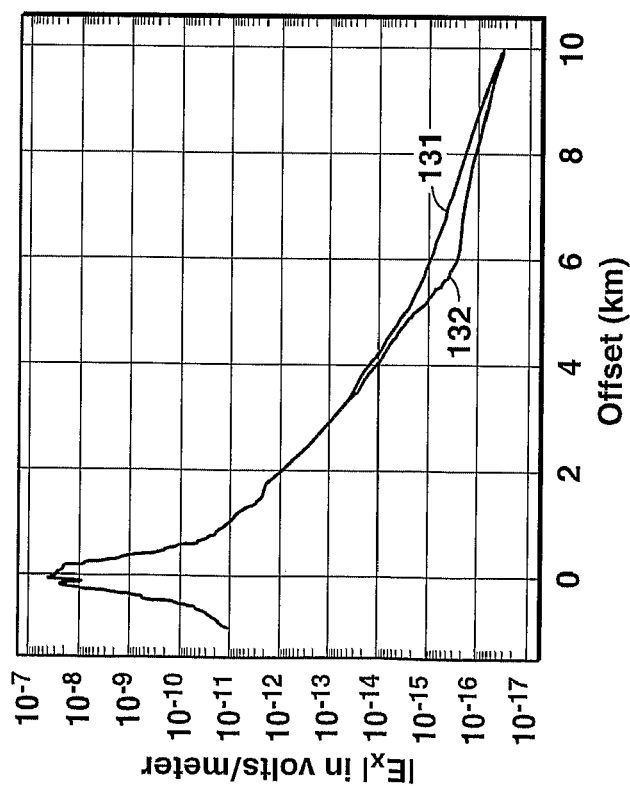

FIGS. 13A and 13B show that the perfectly conducting shield makes it possible to detect the presence of the reservoir where it was previously obscured by the air wave. As before, FIG. 13A shows the absolute value of the inline electric field along the water bottom as a function of offset with shielding included. The model with the resistive reservoir 131 is plotted above the model with the reservoir replaced with additional shale 132. The effect of the reservoir is evident. FIG. 13B shows the electric field vs. offset without shielding. The models with and without resistive reservoir are no longer distinguishable because of the strong air wave.

The model calculations illustrated by FIGS. 10A-B, 11A-B, 12A-B and 13A-B show how step 51 of FIG. 5 may be performed. The decision 52 on whether to use active cancellation or conductive shielding would depend on economic and logistical factors in addition to the predicted SNR values.

Also, as stated above, both shielding and active cancellation can be used together to potentially obtain a level of air-wave suppression that would be unachievable with either method alone. In the case of combined use, the design parameters for active cancellation are preferably determined using models that include the shielding. For source-side shielding, the secondary source may need to be either positioned somewhat lower or off to the side(s) to avoid "shorting" through the shield. Receiver-side shielding may be preferable for this reason, and because of the added benefit of reduced MT noise that would reach the receiver(s).

The foregoing application is directed to particular embodiments of the present invention for the purpose of illustrating it. It will be apparent, however, to one skilled in the art, that many modifications and variations to the embodiments described herein are possible. For example, most CSEM surveys are conducted in marine environments, but some are conducted on land, and both the active cancellation embodiments and the conductive shield embodiments of the present invention are suitable for either environment. All such modifications and variations are intended to be within the scope of the present invention, as defined in the appended claims.

The invention claimed is:

1. A method for reducing the amount of source signal reaching a receiver through an air wave path (air wave noise), or reducing magnetotelluric (MT) noise at the receiver, in the course of electromagnetic field measurements in a controlled source electromagnetic survey of a subterranean region, comprising:
   (a) deploying a primary electromagnetic source and at least one receiver;
   (b) deploying a second electromagnetic source with its output signal designed to reduce air wave and MT noise by active cancellation in combined measured responses of the two sources operating simultaneously; and
   (c) activating the sources and collecting data at the one or more receivers;
   wherein active cancellation means cancellation accomplished by survey equipment deployment and design rather than by data processing, said active cancellation occurring in the medium or media in which electromagnetic energy is propagated from the two sources.

2. The method of claim 1, wherein the output signal from the second electromagnetic source is determined using a monitoring detector to assess air wave and MT noise level and provide a signal representing this, and using this signal from the monitoring detector to adjust the output signal from said second electromagnetic source.

3. The method of claim 2, wherein the monitoring detector is located according to criteria including enhancement of the amount of air wave contribution in its measured signal.

4. The method of claim 2, wherein the monitoring detector is a survey receiver.

5. The method of claim 2, wherein the subterranean region is under water and the monitoring detector is located on a floating buoy that transmits measured field values to a survey vessel.

6. The method of claim 2, wherein the subterranean region is under water and the monitoring detector is towed by a survey vessel.

7. The method of claim 2, wherein the subterranean region is under water and the monitoring detector is located on a survey vessel.

8. The method of claim 2, wherein using the monitoring detector to adjust the output signal from the second electromagnetic source comprises:
   (a) selecting a frequency from the primary source's signal spectrum using a bandpass filter;
   (b) splitting the bandpass-filtered signal into two signals, then phase-shifting one of the split signals by 90°;
   (c) scaling the two split signals with scaling factors;
   (d) summing the two scaled signals;
   (e) driving the second electromagnetic source with the summed signal;
   (f) receiving a combined signal from the primary source and the second source at the monitoring detector;
   (g) bandpass filtering the signal received at the monitoring detector, selecting the same frequency as in step (a) above;
   (h) using the bandpass-filtered signal from the previous step to adjust the two scale factors to reduce signal energy in the signal received at the monitoring detector at the selected frequency; and
   (i) repeating steps (c)-(h) using the adjusted scale factors.

9. The method of claim 8, wherein the scale factors are adjusted using a least-mean square algorithm.

10. The method of claim 9, wherein the scale factors are represented by w1 and w1q and are adjusted by the following equations:

$$w_1(j+1) = w_1(j) + \mu\epsilon_1(j)x_1(j)$$ and $$w_{1q}(j+1) = w_{1q}(j) + \mu\epsilon_1(j)x_{1q}(j)$$

where $\mu$ is an adaptation rate scale factor, $x_1(j)$ and $x_{1q}(j)$ are the split signals from step (b), $\epsilon_1(j)$ is the bandpass-filtered signal returned from the monitoring detector at the end of step (g), and index j denotes a time sample before adjustment and index j+1 denotes a time sample after adjustment.

11. The method of claim 2, wherein the survey takes place in a marine environment, and the monitoring detector is a horizontal electric field detector located near the top of the water and horizontally separated from the primary and second sources at a distance comparable to longer source-receiver spacings used in the survey.

12. The method of claim 1, wherein the survey takes place in a marine environment, and the primary source is towed near the water bottom, and the second source is towed above the primary source at a shallow depth.

13. The method of claim 1, wherein the electromagnetic sources are electric bipoles.

14. The method of claim 1, wherein the primary electromagnetic source transmits with a frequency spectrum comprising one or more discrete frequencies, and the second electromagnetic source transmits with a frequency spectrum comprising the same one or more discrete frequencies.

15. A method for producing hydrocarbons from a subsurface region, comprising:
   (a) conducting a controlled source electromagnetic survey of the subsurface region, comprising:
      (i) deploying a primary electromagnetic source and at least one receiver; and
      (ii) deploying a second electromagnetic source with its output signal designed to reduce air wave and magnetotelluric (MT) noise by active cancellation in combined measured responses of the two sources operating simultaneously, wherein active cancellation means cancellation accomplished by survey equipment deployment and design rather than by data processing, said active cancellation occurring in the medium or media in which electromagnetic energy is propagated from the two sources;
   (b) drilling a well into a layer of the subsurface region indicated in data from the electromagnetic survey as possibly containing hydrocarbons; and
   (c) producing hydrocarbons from the well.

* * * * *